United States Patent
Oike et al.

(10) Patent No.: US 9,530,530 B2
(45) Date of Patent: Dec. 27, 2016

(54) SCINTILLATOR PANEL, RADIATION DETECTOR, AND METHODS FOR MANUFACTURING THE SAME

(71) Applicant: CANON KABUSHIKI KAISHA, Tokyo (JP)

(72) Inventors: Tomoyuki Oike, Honjo (JP); Yoshinori Shibutani, Tokyo (JP); Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/000,472

(22) Filed: Jan. 19, 2016

(65) Prior Publication Data

US 2016/0217879 A1    Jul. 28, 2016

(30) Foreign Application Priority Data

Jan. 22, 2015  (JP) ................. 2015-010462

(51) Int. Cl.
*G01T 1/20* (2006.01)
*G21K 4/00* (2006.01)
*G01T 1/202* (2006.01)

(52) U.S. Cl.
CPC ............ *G21K 4/00* (2013.01); *G01T 1/202* (2013.01); *G01T 1/2018* (2013.01); *G21K 2004/06* (2013.01)

(58) Field of Classification Search
CPC ... G01T 1/2018; G01T 1/202; G21K 2004/06; G21K 4/00
See application file for complete search history.

(56) References Cited

U.S. PATENT DOCUMENTS

2005/0023733 A1* 2/2005 Burr ................ G01T 1/1611
                                                    264/400
2014/0061485 A1* 3/2014 Nagano ............ G01T 1/2018
                                                    250/363.02

FOREIGN PATENT DOCUMENTS

| JP | 2015-1387 A | 1/2015 |
|---|---|---|
| WO | 2011-089946 A1 | 7/2011 |
| WO | 2013-089015 A1 | 4/2015 |

* cited by examiner

*Primary Examiner* — Mark R Gaworecki
(74) *Attorney, Agent, or Firm* — Canon USA, Inc. I.P. Division

(57) ABSTRACT

A method is provided for manufacturing a scintillator panel including a substrate and a scintillator layer containing a plurality of crystals formed by depositing a scintillator material on a deposition surface of the substrate. The method includes depositing the scintillator material on the deposition surface of the substrate such that the scintillator material incidents on the deposition surface obliquely with respect to the normal to the deposition surface, and varying the angle between a reference direction on the deposition surface and a projected incident direction that is obtained by projecting the direction of the scintillator material incident onto the deposition surface. In the vapor deposition, the amount of the scintillator material deposited on the deposition surface changes according to the angle between the projected incident direction and the reference direction.

20 Claims, 12 Drawing Sheets

SCINTILLATOR PANEL, RADIATION DETECTOR, AND METHODS FOR MANUFACTURING THE SAME

BACKGROUND OF THE INVENTION

Field of the Invention

The preset disclosure relates to a scintillator panel, a radiation detector including the scintillator panel, and methods for manufacturing the scintillator panel and the radiation detector.

Description of the Related Art

Flat panel detectors (FPDs) and the like used for radiography in medical practice and other fields convert radiation that has passed through an object into light in the scintillator layer therein and detect the light from the scintillator layer with a light-receiving element. For a scintillator layer that can efficiently transmit light generated therein, needle crystals of cesium iodide formed by vapor deposition are used. The needle crystals are separate from each other by voids formed therebetween, and the difference between the refractive index of cesium iodide (about 1.8) and the refractive index of air (1.0) causes the light generated in the cesium iodide needle crystals to repeat total reflection, thus guiding the light to the light-receiving element. Consequently, the modulation transfer function (MTF) of the radiation detector is increased. The term needle crystals used herein refer to crystals grown in one direction and is not limited by the shape of the tips of the crystals (hence, columnar crystals are included).

For forming needle crystals by vapor deposition, a method generally referred to as oblique incidence evaporation or oblique vapor deposition is known. Oblique vapor deposition is a method of vapor deposition performed such that the angle (incident angle 5) between the normal 11 to the deposition surface 6 of a substrate and the incident direction 54 of the particles 4 of the deposition material (particles of scintillator material in the present disclosure) is more than 0 degrees, as shown in FIG. 9. An effect of shadows 13 produced by tips of needle crystals 10, namely, shadowing effect, causes particles 4 of the deposition material not to directly reach an area between adjacent crystals, consequently forming voids 12. Since the size of the shadows 13 can be adjusted by varying the incident angle 5, the size (width) of the voids 12 can also be adjusted.

International Publication No. WO 2013-089015 discloses a method for producing a scintillator panel by oblique vapor deposition. In this method, a substrate and a deposition source are arranged so that a scintillator material can incident obliquely on a deposition surface of the substrate, and the material is deposited while the substrate is rotated in a direction 7. This method allows the scintillator material to incident on the needle crystals formed on the deposition surface in various directions, and accordingly enables each of the needle crystals to grow along the normal to the deposition surface.

Unfortunately, the oblique vapor deposition disclosed in the cited International Publication No. WO 2013-089015 does not allow the needle crystals to be aligned in a plane at the surface of the substrate.

SUMMARY OF THE INVENTION

According to an aspect of the present disclosure, there is provided a method for manufacturing a scintillator panel including a substrate and a scintillator layer containing a plurality of crystals formed by depositing a scintillator material on a deposition surface of the substrate. The method includes depositing the scintillator material on the deposition surface of the substrate in such a manner that the scintillator material incidents on the deposition surface obliquely with respect to the normal to the deposition surface and varying the angle between a reference direction on the deposition surface and a projected incident direction that is obtained by projecting the direction of the scintillator material incident onto the deposition surface. In the step of depositing the scintillator material, the amount of the scintillator material deposited on the deposition surface changes according to the angle between the projected incident direction and the reference direction.

Other aspects of the present disclosure will be described in exemplary embodiments disclosed herein.

Further features of the present invention will become apparent from the following description of exemplary embodiments with reference to the attached drawings.

DESCRIPTION OF THE EMBODIMENTS

As described above, if needle crystals are formed by oblique vapor deposition as disclosed in the above-cited International Publication No. WO 2013-089015, the needle crystals are not aligned in a plane at the surface of the substrate. Accordingly, adjacent needle crystals are likely to come into contact with each other. If needle crystals are in contact with each other, an area is formed where light waves are unlikely to be guided due to a difference in refractive index, or the region where light is confined can be expanded even though light waves are guided. This can be a cause of a decrease in modulation transfer function (MTF). If the incident angle of the deposition material is increased so as to increase the distance between adjacent needle crystals, the packing density (the volume of scintillator material actually deposited to the volume of the scintillator layer (base area×thickness)) is reduced, and accordingly, the efficiency of conversion of radiation into light is likely to decrease.

The present inventors thought that by aligning the orientations of the needle crystals in a plane at the surface of the substrate, needle crystals in contact with each other can be reduced without increasing the distance between the needle crystals or can be prevented from increasing even if the distance between the needle crystals is increased. Next described is a method for forming a scintillator layer containing needle crystals aligned in a plane at the surface of a substrate and a method for manufacturing a radiation detector including the scintillator layer, according to the following embodiments with reference to the drawings.

Figure 2A:
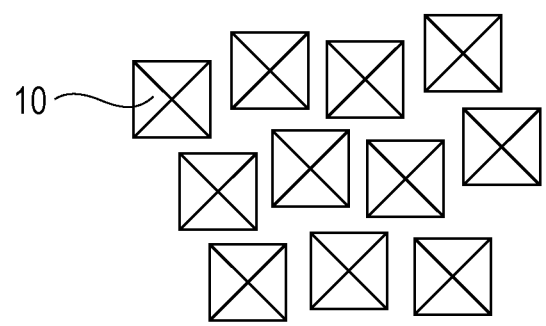
FIGS. 2A and 2B are a schematic plan view and a perspective view of a plurality of needle crystals, respectively, according to an embodiment of the present disclosure.
Figure 2B:
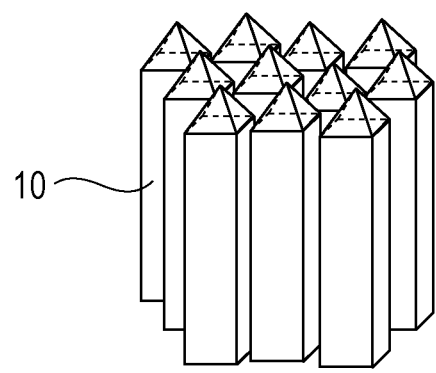
Figure 3A:
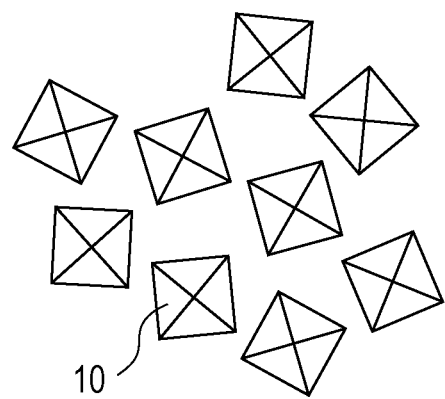
FIGS. 3A and 3B are a schematic plan view and a perspective view of a plurality of needle crystals, respectively, of the Comparative Example.
Figure 3B:
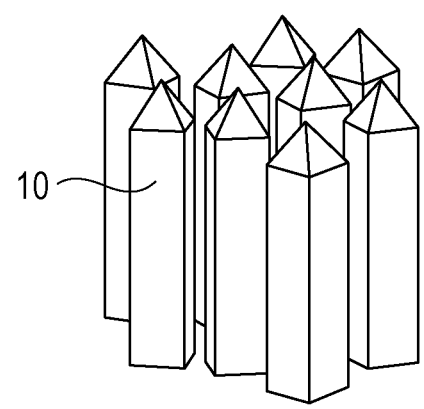
Figure 4A:
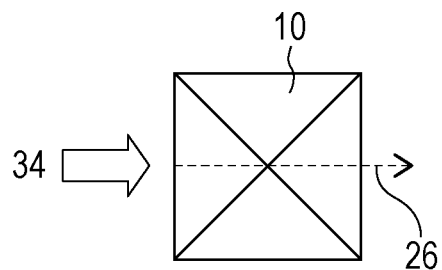
FIGS. 4A to 4D are schematic plan views illustrating a deposition method according to an embodiment of the present disclosure.
Figure 4B:
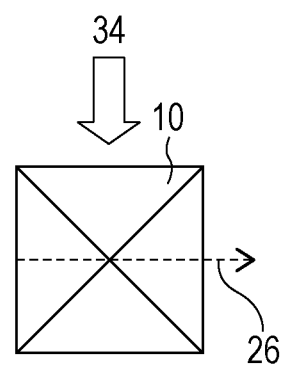
Figure 4C:
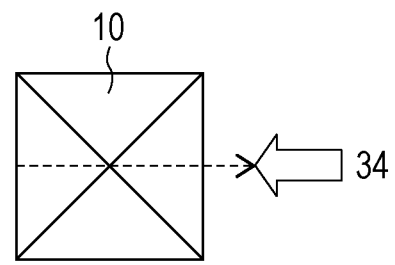
Figure 4D:
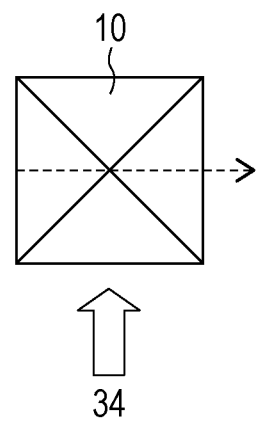

The scintillator panels of the following first to third embodiments each include a scintillator layer containing a plurality of crystals and a substrate on which the scintillator layer is disposed. It is desirable that the crystals be needle crystals, some of which have voids therebetween. In addition, the in-plane orientations of the needle crystals 10 of the scintillator layer are aligned as shown in the schematic views of FIGS. 2A and 2B. When the orientations of the crystals are aligned, the decrease in MTF caused by crystals in contact with each other can be more relieved and the packing density can be more increased compared with the case of crystals having irregular orientations as shown in the schematic views of FIGS. 3A and 3B. FIGS. 2A and 3A illustrate needle crystals viewed from a plane parallel to the substrate, and FIGS. 2B and 3B are each perspective views of the crystals. Since the amount of scintillator material per unit area is increased by increasing the packing density, the conversion efficiency of the scintillator can be increased, and the sensitivity of the radiation detector can be increased accordingly. In the description in the present disclosure, the phrase "in-plane orientations of crystals are aligned" implies that the crystals are in a state in which a plurality of peaks at regular intervals can be observed when the crystals are subjected to $\phi$ scanning. Also, a plurality of peaks at regular intervals observed in a $\phi$ scan result of a scintillator layer containing a plurality of scintillator crystals indicate that the scintillator layer has in-plane orientation. Even if the scintillator layer has in-plane orientation, all the scintillator crystals in the scintillator layer are not necessarily strictly aligned, and some of the scintillator crystals may not be aligned in some cases. However, when a plurality of peaks are observed by $\phi$ scanning as described above, the orientations of almost all the scintillator crystals in the scintillator layer can be considered to be aligned. The $\phi$ scanning is a method of X-ray diffraction analysis, performed while a sample is being rotated around the normal to the deposition surface. The $\phi$ scanning produces a peak in a pattern of in-plane diffraction lines. If orientations are not aligned, a pattern of no diffraction lines is formed (X-rays are diffracted in all directions) and accordingly, no peaks are observed.

In the first to third embodiments, the scintillator material is intermittently deposited while the substrate and the deposition source are being relatively rotated (by at least one of the in-plane rotation of the substrate on the axis thereof or the rotation of the deposition source around the substrate). Thus, the amount of the scintillator material deposited on the deposition surface changes according to the angle of incident scintillator material with respect to a direction on the deposition surface defined as a reference direction, and crystal planes are formed according to the angle. For example, when the angle of incident scintillator material with respect to the reference direction 26 is 0, $1/2\pi$, $\pi$, or $3/2\pi$ as shown in FIGS. 4A to 4D, the amount of the scintillator material deposited on the deposition surface is increased. Consequently, needle crystals 10 are formed so that each crystal has planes to which the normals form angles of 0, $1/2\pi$, $\pi$, and $3/2\pi$ to the reference direction. Thus, the orientations of the needle crystals are aligned. In this instance, the scintillator layer has a 4-fold rotational symmetry. In the description disclosed herein, a deposition boat containing a deposition material 2 is called a deposition source 1. In the description disclosed herein, the amount of the scintillator material deposited on the deposition surface (or the amount of deposit) refers to the total amount of the scintillator material deposited directly on the deposition surface and the scintillator material deposited on the needle crystals that has been already formed on the deposition surface.

Figure 1A:
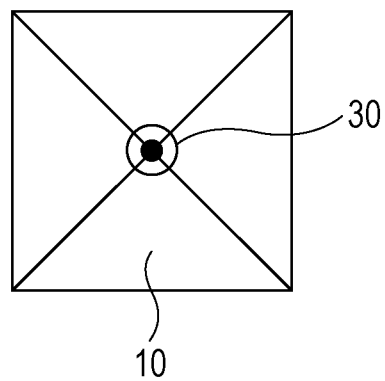
FIGS. 1A and 1B are a schematic plan view and a perspective view of a needle crystal, respectively, according to an embodiment of the present disclosure.
Figure 1B:
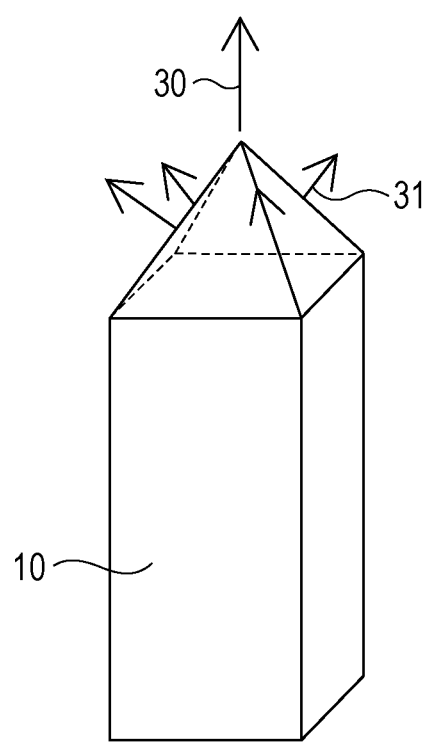

As described above, needle crystals having n-fold rotational symmetry are formed by depositing a scintillator material so that the amount of the deposited material on the deposition surface is increased at angles of $2(n-1)\pi/n$, such as 0, $2\pi/n$, and $4\pi/n$. The value of n is set according to the crystal structure of the scintillator material to be used. If cesium iodide, whose crystal is cubic, as shown in FIGS. 1A and 1B, is used as the scintillator material, the resulting needle crystals have 4-fold rotational symmetry. Therefore the needle crystals of cesium iodide can be aligned by deposition with n=4 performed so that the amount of scintillator material deposited from the directions shown in FIGS. 4A to 4D is increased. For a scintillator material having 6-fold rotational symmetry, such as hexagonal crystals, the orientations of the needle crystals can be aligned by setting the n value to 6. Examples of the scintillator material of hexagonal needle crystals include lead oxide and zinc sulfide. In FIGS. 1A and 1B, reference numeral 30 designates the crystal orientation of the [001] plane, and reference numeral 31 designates the crystal orientations of the <110> planes.

In the description disclosed herein, the angle (of the incident scintillator material) with respect to the reference direction 26 refers to the angle of the incident direction of the scintillator material 54 projected on the deposition surface 6 (this direction may be referred to as projected incident direction 34) with respect to the reference direction 26. If a scintillator material is deposited on a deposition surface from a deposition source while diffusing, the center line of the scintillator material incident on the deposition surface is defined as the incident direction of the material. The center line coincides with the straight line connecting the emission opening to the center of the region of the deposition surface on which the scintillator material actually incidents. The reference direction 26 refers to an arbitrary direction on the deposition surface.

The embodiments will be further described in detail.

First Embodiment

Figure 5A:
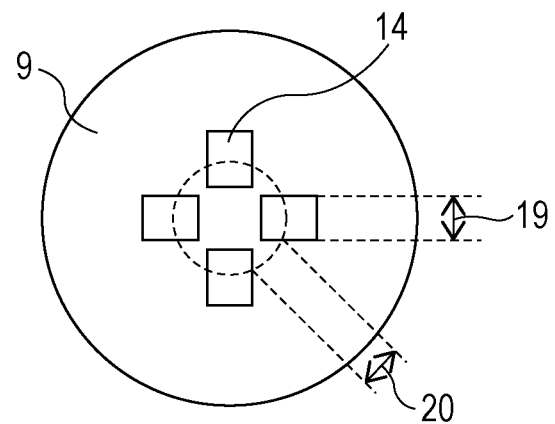
FIGS. 5A and 5B are a plan view of a shutter and a side view of a deposition apparatus, respectively, according to a first embodiment.
Figure 5B:
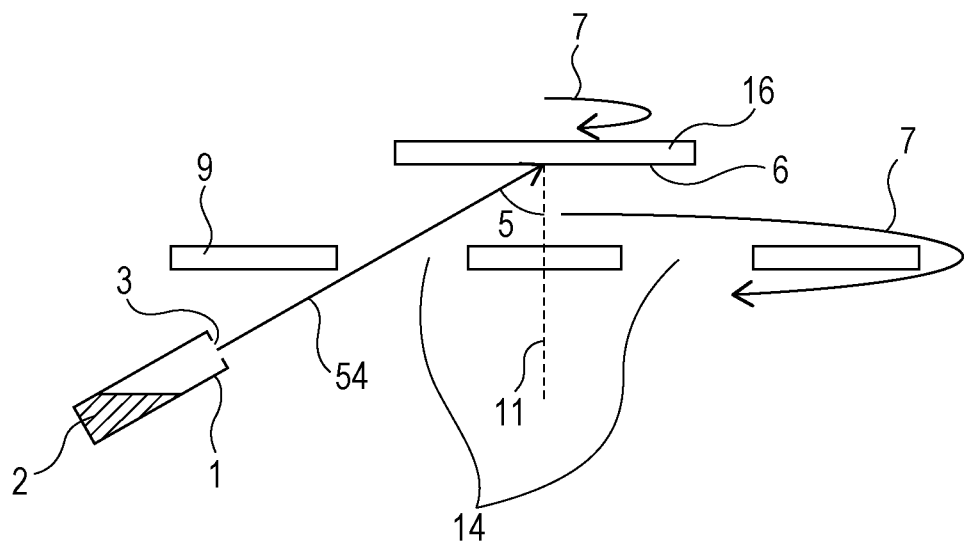

In a first embodiment, the scintillator material is intermittently deposited by using a shutter having a shield portion that blocks the scintillator material and a penetrable portion through which the scintillator material passes. Such intermittent deposition enables the amount of the scintillator material deposited on the deposition surface to change according to the angle between the projected incident direction and the reference direction. The shutter may have a plurality of penetrable portions 14 as the shutter 9 shown in FIGS. 5A and 5B. The shutter 9 acts as a shield that blocks the scintillator material, and the scintillator material passes through the penetrable portions 14 of the shutter 9. In FIGS. 5A and 5B, the penetrable portions 14 are openings. For the sake of distinguishing shutters used for ordinary deposition (which open for deposition and close for suspending deposition), the shutter for intermittent deposition may be referred to as an intermittent deposition shutter. The shutter 9 is disposed between the deposition source 1 and the substrate 16, and the shutter 9 is rotated in a plane in a direction 7 in association with the rotation of the substrate 16. The amount of the scintillator material deposited on the deposition surface thus changes according to the angle between the projected incident direction and the reference direction.

A case of using cesium iodide as the scintillator material will now be described. FIG. 1A is a top view of a cesium iodide needle crystal 10, in which the height of the needle crystal is designated in the depth direction of the figure, and FIG. 1B is a perspective view of the needle crystal. As shown in FIGS. 1A and 1B, the cesium iodide crystal is cubic. The shape thereof in a plane at the deposition surface (that is, the shape of the section thereof) is square and the edges extending from the vertices of the square to the tip of the needle crystal are perpendicular to each other; hence this crystal has 4-fold rotational symmetry. When the crystals of the scintillator material have 4-fold rotational symmetry, n=4 is applied so that the amount of the scintillator material deposited on the deposition surface is increased at angles of 0, $1/2\pi$, $\pi$ and $3/2\pi$ with respect to the reference direction (the angle at this time may be referred to as deposition material feed angle). Also, it is desirable that the amount of deposit of the scintillator material at angles of $1/4\pi$, $3/4\pi$, $5/4\pi$ and $7/4\pi$ be reduced (the angle at this time may be referred to as deposition material non-feed angle), and that the amount of deposit at other angles is between the amount at the deposition material feed angles and the amount at the deposition material non-feed angles. Desirably, the amount of deposit periodically changes in a cycle of $2\pi/n$.

The amount of the scintillator material deposited on the deposition surface changes according to the angle between the projected incident direction and the reference direction, and it is desirable that if the amount of deposit periodically changes, the contrast of the amount of deposit in one cycle is 2.6 or more. The contrast of the amount of deposit mentioned herein refers to the ratio of the amount of deposit at a deposition material feed angle to the amount of deposit at a deposition material non-feed angle. This is equivalent to the ratio of the largest amount of deposit to the smallest amount of deposit when the amount of deposit changes in one cycle. When the cycle of changing the amount of deposit is $2\pi/n$, the numbers of deposition material feed angles and deposition material non-feed angles in the range of 0 to less than $2\pi$ are each n. It is desirable that the amounts of deposit at n deposition material feed angles be within the average thereof ±10% and that the amounts of deposit at n deposition material non-feed angels be within the average thereof ±10%.

It will now be described how the amount of deposit at deposition material feed angles is measured. In a state where a substrate, an intermittent deposition shutter shown in FIGS. 5A and 5B, and a deposition source are arranged in a relatively fixed positional relationship (in a state where the substrate and the intermittent deposition shutter are not rotated) so that the deposition material can pass through the center of any of the penetrable portions 14 of the shutter, a deposition material is emitted from the deposition source for vapor deposition. The thickness of the material deposited in a region of the deposition surface of the substrate right above the center of any of the penetrable portions 14 is defined as the amount of deposit at a deposition material feed angle. Similarly, in a state where the substrate, the intermittent deposition shutter, and the deposition source are arranged in a relatively fixed positional relationship so that the deposition material can incident on the center of a shield portion of the shutter, the deposition material is emitted from the deposition source for vapor deposition The thickness of the material deposited in a region right above the center of the shield portion is defined as the amount of deposit at a deposition material non-feed angle. If a shutter having penetrable portions (openings) 14 in the same shape with the same size, arranged at regular intervals is used as in the present embodiment, the amounts of deposit at the deposition material feed angles can be considered to be the same, and the amounts of deposit at the deposition material non-feed angles are considered to be the same as well.

If the amount of deposition does not change, the contrast of the amount of deposit in one cycle is 1.

If the distance 19 between the shield portions (width of the openings) is reduced, the deposition material becomes likely to be deposited around the intended region depending on the size of the deposition material emission opening of the deposition source and the deposition atmosphere, and thus the contrast of the amount of deposit is reduced. Accordingly, if a specific contrast is required, the distance between the shield portions is determined allowing for the material deposited around the intended region. The contrast of the amount of deposit can be increased by reducing the proportion of the distance 20 between the penetrable portions (width of the shield portions). In this instance, however, the amount of the deposition material deposited on the shutter is increased, and the absolute deposition rate is reduced; hence the use efficiency of the material is reduced. Advantageously, the contrast of the amount of deposit is 137 or less.

The angles expressed by $2\times(n-1)\pi/n$ such as 0, $2\pi/n$, and $4\pi/n$ are angles at which the amount of deposit is large (deposition material feed angles), and between which angles at which the amount of deposit is small (deposition material non-feed angles) lie desirably. More desirably, the angle between the projected incident direction in which the amount of deposit is the largest and the reference direction lies within a range of $2\times(n-1)\pi/n$ (such as 0, $2\pi/n$, or $4\pi/n$)±$0.2\pi/n$. In the description disclosed herein, a small amount of deposit may be 0, and a case where the deposition materials are not deposited is also one of the cases of a small amount of deposit.

From the viewpoint of ensuring the shadowing effect of oblique vapor deposition, the incident angle 5 of the deposition material with respect to the normal to the deposition surface is advantageously 45 degrees or more, more advantageously 60 degrees or more. Also, the incident angle 5 is advantageously 70 degrees or less. If the incident angle 5 is small, the shadowing effect of oblique vapor deposition does not satisfactorily produced, and accordingly the MTF of the scintillator can be reduced. In contrast, if the incident angle 5 is large, the voids between needle crystals become large and, consequently, the packing density of the scintillator material is reduced. Also, the amount of the scintillator material deposited outside the deposition surface of the substrate (on the inner wall of the deposition apparatus, the intermittent deposition shutter or the like) is increased and, consequently, the use efficiency of the deposition material is reduced. In addition, the distance between the deposition surface of the substrate and the deposition source is likely to vary widely and, accordingly, the formation of a layer with a desired uniform thickness become difficult.

Figure 8A:
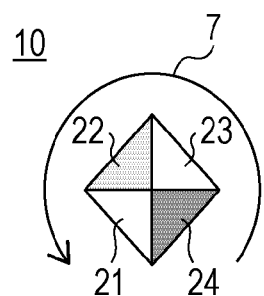
FIGS. 8A and 8B are a schematic plan view and a perspective view, each illustrating a state where a deposition material is fed to a needle crystal.
Figure 8B:
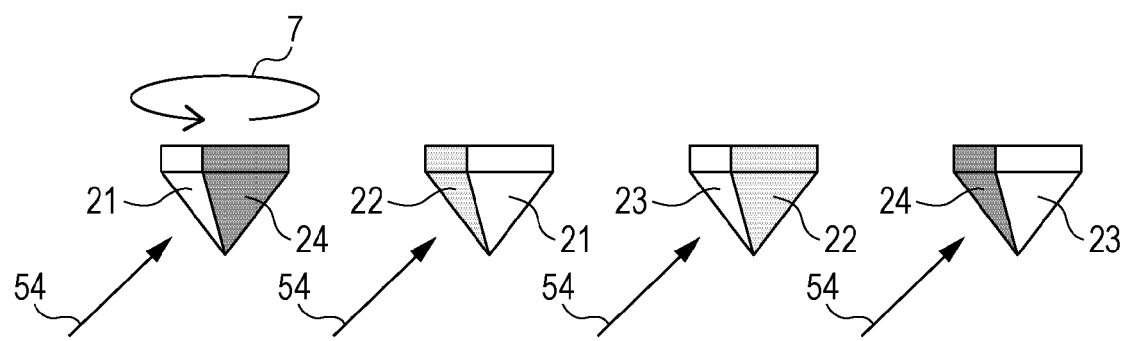
Figure 9:
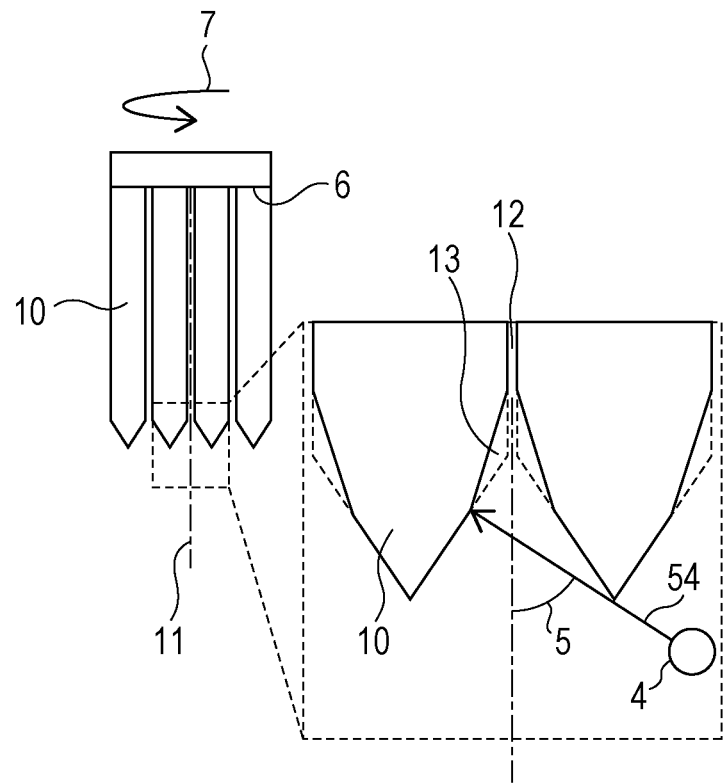
FIG. 9 is an illustrative representation of the shadowing effect of oblique vapor deposition.

In order to change the amount of the scintillator material deposited on the deposition surface according to the angle between the projected incident direction and the reference direction, in the present embodiment, the shutter 9 shown in FIGS. 5A and 5B is disposed between the deposition source 1 and the deposition surface 6, as described above. The shutter 9 shown in FIGS. 5A and 5B has four penetrable portions 14. When the shutter is rotated once in a plane, the penetrable portions come four times between the deposition source 1 and the deposition surface 6. The shutter 9 is disposed between the deposition source 1 and the deposition surface 6 as shown in FIG. 5B, and the substrate is rotated in a plane (on the axis thereof) in synchronization with the in-plane rotation of the shutter on the axis thereof so that the angular velocities of the substrate and the shutter can be the same. Consequently, the deposition material from the deposition source 1 can reach the deposition surface 6 through any of the penetrable portions 14 every ¼ rotation (see FIGS. 8A and 8B). FIG. 8A is a top view of a cesium iodide needle crystal 10, showing four deposition planes 21 to 24 of the crystal. If the substrate and the shutter are rotated in synchronization with each other as described above, the deposition material can be fed to the four planes of the crystal through each of the four penetrable portions of the shutter 4. The number of the penetrable portions is desirably the same as the number of rotational symmetries.

Although the shutter 9 shown in FIGS. 5A and 5B has a plurality of openings or penetrable portions, the number of penetrable portions may be one. Such a shutter can function as a shutter having n openings by setting the rotation speed of the shutter to n times of the rotation speed of the substrate.

Figure 6A:
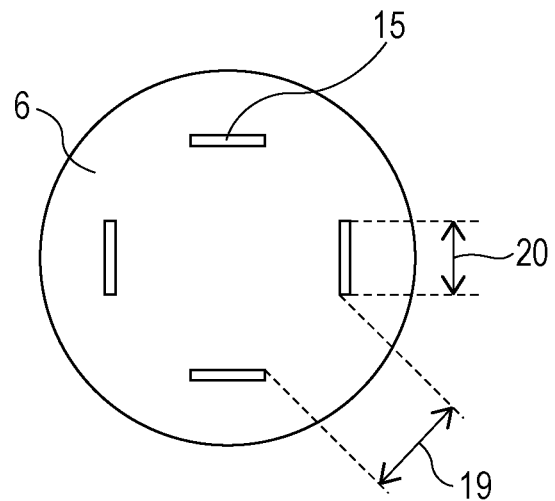
FIGS. 6A and 6B are a plan view of a substrate and a side view of a deposition apparatus using the substrate, respectively, according to a modification of the first embodiment.
Figure 6B:
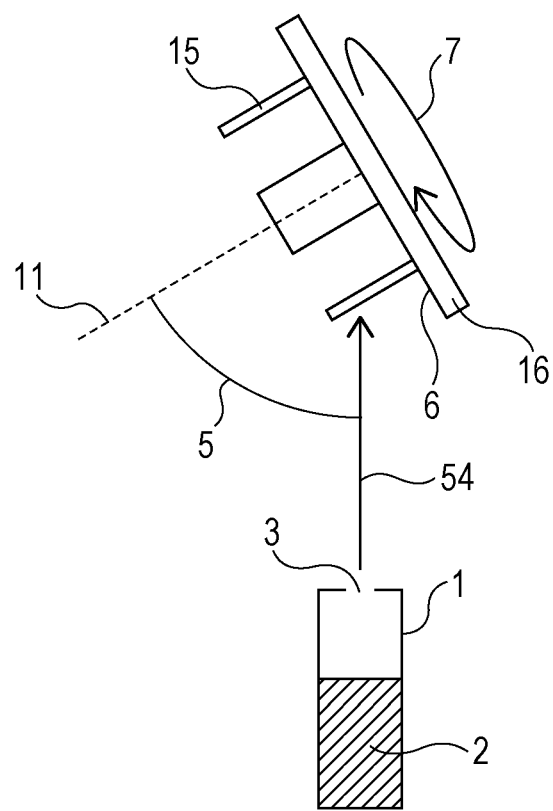

The amount of the scintillator material deposited on the deposition surface 6 may change according to the angle between the projected incident direction and the reference direction by disposing a plurality of screens 15 on the deposition surface 6 of the substrate, as shown in FIG. 6A, instead of using the shutter 9. The screens 15 are arranged at certain intervals on the deposition surface 6. Since the incident direction 54 of the deposition material is oblique with respect to the deposition surface 6 as shown in FIG. 6B, the screens 15 restrict the deposition of the deposition material. Thus, the plurality of screens 15 have the same function as the shield portions of the shutter, and the spaces between the screens have the same function as the penetrable portions of the shutter. If the screens 15 are arranged on the deposition surface 6, the substrate is not required to be synchronized with the rotation of the shutter. Accordingly, the deposition apparatus can be simpler in structure than the case of using the shutter. Thus, the shutter is not necessarily flat like the illustrated shutter 9, as long as the amount of the scintillator material deposited on the deposition surface can change according to the angle between the projected incident direction and the reference direction.

One of the other approaches to aligning the in-plane orientations of the crystals in the scintillator layer may be to epitaxially grow a scintillator material on a deposition surface defined by a crystal plane having the same lattice constant as the scintillator crystals. For example, if cesium iodide is used as the scintillator material, at least the deposition surface of the substrate is made of monocrystalline cesium iodide. Thus the in-plane orientations of the crystals in the scintillator layer can be aligned with the in-plane orientation of at least the surface of the substrate in contact with the scintillator layer. In order to align the orientations of a plurality of crystals by such epitaxial growth, however, a monocrystalline substrate must be used. This makes it difficult to increase the area of the scintillator layer. On the other hand, the present embodiment does not require controlling the orientations of crystals by crystal orientation of the substrate. Accordingly, the resulting scintillator panel may include a scintillator layer whose crystal orientations are aligned and a substrate whose orientation, in part, is not aligned with that of the scintillator layer. Since the orientations of the crystals need not be controlled by the crystal orientation of the substrate, the substrate may be made of glass, a ceramic, a resin, or a composite thereof, and a scintillator layer having good in-plane orientation can be formed on such an amorphous surface. Hence, a scintillator layer containing a plurality of cesium iodide needle crystals whose orientations are aligned can be formed on a substrate other than monocrystalline cesium iodide.

Although a single deposition material is deposited in the above described embodiment, a plurality of materials may be deposited. For example, for forming needle crystals of mainly cesium iodide, a luminescent center material, such as thallium, may be added. This is advantageous for increasing luminance. For adding thallium, thallium iodide may be used as an additional deposition material. Although thallium iodide may be mixed with cesium iodide for vapor deposition, it is advantageous that thallium iodide and cesium iodide be fed from different deposition sources. This is because thallium iodide and cesium iodide have a large difference in vapor pressure. The amount of thallium to be added can be easily controlled by independently controlling each of the heating temperatures of the deposition sources. The amount of such a luminescent center material to be added is very small and is typically 1% by mole or less. Accordingly, the orientation of the needle crystals is not affected much by thallium iodide even if the incident direction of thallium iodide is not aligned with the incident direction of cesium iodide, and thallium iodide need not necessarily be intermittently deposited. If a very small amount of a material not affecting much the crystal structure is added, the contrast of the amount of deposit may be 1 as in the known oblique vapor deposition. The chemical constitution of the scintillator layer, including the thallium content, may be estimated by fluorescent X-ray diffraction.

Figure 16:
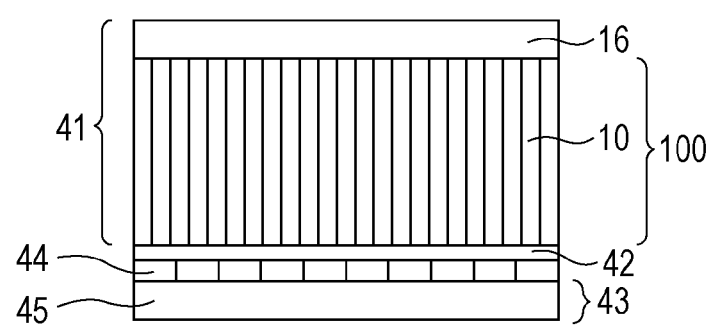
FIG. 16 is a schematic sectional view of a radiation detector according to an embodiment of the present disclosure.

The resulting scintillator panel 41 produced according to the present embodiment may be combined with a photodetector 43 to provide a radiation detector. FIG. 16 shows a radiation detector according to the present embodiment. The scintillator panel 41 includes a substrate 16 and a scintillator layer 100 (layer containing a plurality of needle crystals 10) on the substrate. The photodetector 43 includes a photodetector substrate 45 and a plurality of light-receiving elements 44 arranged on the photodetector substrate 45. The scintillator layer 100 generates light by being irradiated with radiation. Accordingly, the scintillator panel 41 and the photodetector 43 are arranged in such a manner that the scintillator layer 100 of the scintillator panel 41 is disposed adjacent to the photodetector 43 so that the light enters the light-receiving elements 44 and is thus detected by photodetector 43. Then, the photodetector 43 and the scintillator panel 41 are secured to each other, and thus a radiation detector is produced. A protective layer 42 may be disposed between the photodetector 43 and the scintillator layer 100.

The operation of performing vapor deposition while changing the amount of deposit may be described as below.

The vapor deposition is performed by repeating a sequence of the following first to fourth vapor deposition steps a plurality of times. In a first vapor deposition step, the scintillator material is deposited on the deposition surface of a substrate such that the projected incident direction and the reference direction form a first angle. Similarly, a second vapor deposition step is performed so as to form a second angle; a third vapor deposition step is performed so as to form a third angle, and a fourth vapor deposition step is performed so as to form a fourth angle. In any of the vapor deposition steps, the angle between the direction of the incident deposition material and the normal to the deposition surface is constant.

When the contrast of the amount of deposit in one cycle of changing the amount is 2.6 or more, the amount of the scintillator material deposited in each vapor deposition step satisfies the following: The largest amount of the scintillator material deposited on the deposition surface in the first vapor deposition step is 2.6 times or more the smallest amount of the scintillator material deposited on the deposition surface at an angle larger than the first angle and smaller than the second angle. Similarly, the largest amount of the scintillator material deposited on the deposition surface in the second vapor deposition step is 2.6 times or more the smallest amount of the scintillator material deposited on the deposition surface at an angle larger than the second angle and smaller than the third angle. The largest amount of the scintillator material deposited on the deposition surface in the third vapor deposition step is 2.6 times or more the smallest amount of the scintillator material deposited on the deposition surface at an angle larger than the third angle and smaller than the fourth angle. The largest amount of the scintillator material deposited on the deposition surface in the fourth vapor deposition step is 2.6 times or more the smallest amount of the scintillator material deposited on the deposition surface at an angle larger than the fourth angle and smaller than the first angle.

Second Embodiment

A second embodiment illustrates a vapor deposition performed in a deposition apparatus in which a substrate 16 rotates with respect to a deposition source 1, as shown in FIGS. 5A and 5B, without disposing a shutter 9 between the substrate and the deposition source. The present embodiment is different from the first embodiment in that the amount of the scintillator material deposited on the deposition surface changes according to the angle between the projected incident direction and the reference direction by varying the rotation speed of the substrate during a single rotation, instead of using the shutter. Other portions are the same as in the first embodiment and thus description thereof is omitted.

In the present embodiment, the substrate is rotated in a plane on the axis thereof, and the rotation is suspended at the position where the projected incident direction and the reference direction form a specific angle. Since the deposition material is deposited even during suspending the rotation of the substrate, the amount of deposit when the projected incident direction and the reference direction form the specific angle can be increased relative to the amount of deposit when they form other angles. In the description disclosed therein, the operation of varying the rotation speed includes the operation of varying the rotation speed to zero from any other value.

The present embodiment also allows the amount of deposit to change without using the shutter or the screens arranged on the deposition surface. Accordingly, loss of deposition material corresponding to the amount of the deposition material deposited on the shutter or the screens can be reduced. Since the substrate and the deposition source can be rotated relative to each other as described above, the deposition source may be revolved around the substrate for varying the rotation speed, instead of rotating the substrate. In this instance as well, when the projected incident direction and the reference direction form an angle at which the amount of deposit is increased, the revolution of the deposition source is suspended.

Alternatively, the rotation speed of the substrate or the deposition source may be reduced when the angle between the projected incident direction and the reference direction is in a specific range, instead of suspending the relative rotation. In the present embodiment as well, it is advantageous that the contrast of the amount of deposit be 2.6 or more.

Third Embodiment

Figure 7:
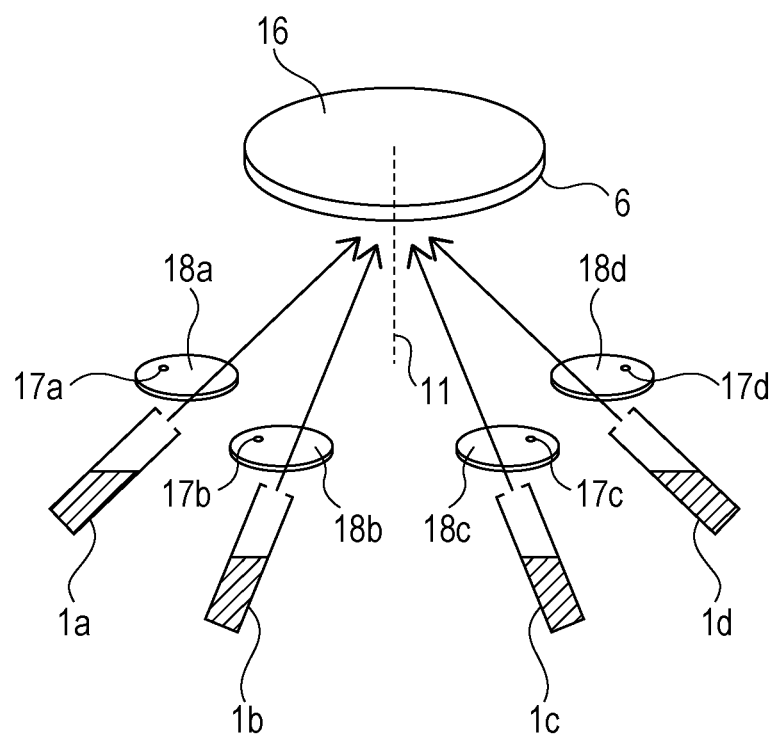
FIG. 7 is a perspective view of a deposition apparatus according to a third embodiment.

In a third embodiment, a plurality of deposition sources 1a to 1d and corresponding shutters 18a to 18d are used as shown in FIG. 7, instead of using a shutter. Each set of the deposition source and the shutter is disposed so that the reference direction and the projected incident direction form a specific angle. Then, the amount of deposit changes by opening and closing the shutters one after another. This is the difference from the first embodiment.

In this instance, the substrate need not necessarily be rotated in a plane, and the same effect as the rotation of the deposition source can be produced by sequentially changing the deposition sources from which the deposition material is fed. The shutters 18a to 18d shown in FIG. 7 each have an opening (17a to 17d) and are opened or closed by the rotation thereof. The number of openings may be one or more. If the deposition material is fed from a plurality of deposition sources at one time, however, in-plane orientations are not easily aligned. It is therefore desirable that the shutters are rotated such that two or more shutters are not opened. The shutters are not necessarily rotatable, but desirably operable so that two or more shutters are not opened at one time.

The present embodiment allows the amount of the scintillator material deposited on the deposition surface to change according to the angle between the projected incident direction and the reference direction without using any mechanisms for rotating the substrate or rotating the deposition source. Also, the use of shutters 18a to 18d can prevent the deposition material from being deposited in an unwanted region at deposition material non-feed angles in theory.

Although the first to third embodiments have been described, any methods can be applied as long as the amount of the scintillator material deposited on the deposition surface can change according to the angle between the projected incident direction and the reference direction. Since the range of the contrast of the amount of deposit depends on the method, the method for changing the amount of deposit can be selected in view of, for example, the contrast of the amount of deposit, the amount of deposition loss, and the structure of the deposition apparatus used. For example, the second and third embodiments can achieve a wider range of the contrast than the first embodiment. However if it is difficult to varying the rotation speed of the substrate or to use a plurality of deposition sources in terms of cost or apparatus size, the first embodiment can be applied. If the first embodiment is applied, the use of screens arranged on the deposition surface can achieve a wider range of the contrast than the use of an intermittent deposition shutter.

The subject matter disclosed herein may be applied to a deposition apparatus adapted to perform vapor deposition on a plurality of substrates at one time. For example, when the first embodiment is applied to a deposition apparatus adapted to perform deposition on a plurality of substrates at one time, a plurality of intermittent deposition shutters corresponding to the respective substrates are used, and the substrate and the intermittent deposition shutter of each set are rotated on the axis thereof while being revolved as in the manner disclosed in International Publication No. WO 2013-089015.

The present disclosure will be further described with reference to Examples and Comparative Example.

COMPARATIVE EXAMPLE

Figure 10:
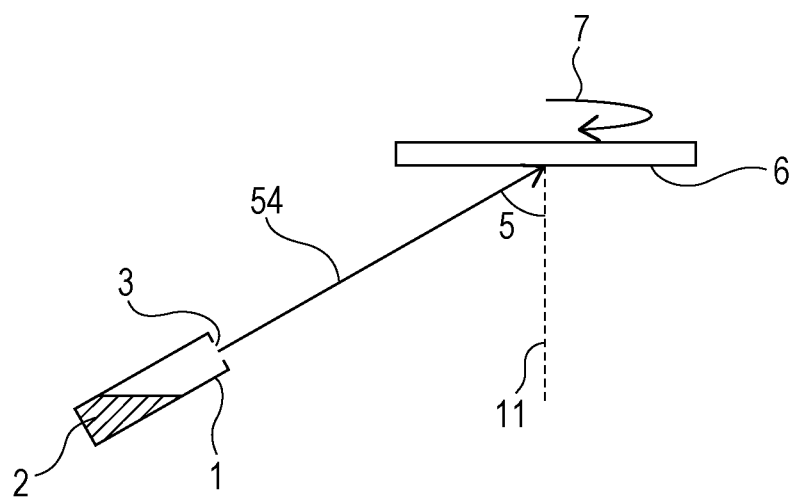
FIG. 10 is a side view of a deposition apparatus used in the Comparative Example.

In the Comparative Example, a scintillator layer containing needle crystals of mainly cesium iodide was formed by oblique vapor deposition using a deposition apparatus as shown in FIG. 10. The oblique vapor deposition was performed by depositing a constant amount (not taking account of error) of scintillator material on the deposition surface independently of the angle between the projected incident direction and the reference direction, that is, at a contrast of 1 in terms of the amount of deposit.

Figure 11:
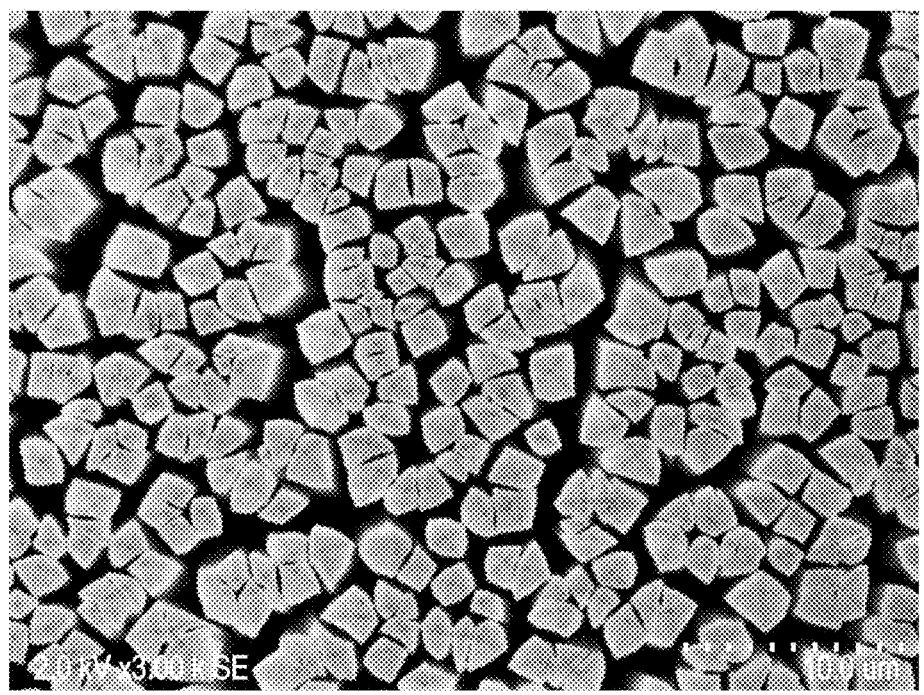
FIG. 11 is a scanning electron micrograph of the surface of a scintillator layer of the Comparative Example.

More specifically, first, a deposition boat (made of tantalum, 20 mm in diameter by 50 mm in length), as shown in FIG. 10, containing 20 g of cesium iodide as the deposition material 2 was prepared as the deposition source 1. Then, the deposition source 1 and a substrate (made of silicon, square of 20 mm on a side, 525 μm in thickness) were disposed in the deposition apparatus so that the deposition material could be emitted at an incident angle of 60° from an emission opening 3 of the deposition source 1 with a distance of 60 mm from the emission opening to the center of the deposition surface 6. In addition, another deposition source 1 (not shown) containing thallium iodide was disposed so that the material could be deposited on the deposition surface 6. After the deposition apparatus was evacuated to 0.01 Pa or less, deposition was started by gradually applying a current to each deposition boat, and opening the shutter (not shown) disposed between the deposition surface 6 and the deposition source. The in-plane rotation speed of the substrate was 30 rpm. Under the observation of the deposition state, the shutters were closed before the materials ran out, and thus the deposition was completed. The substrate and the deposition boats were cooled to room temperature, and then the substrate taken out of the apparatus was observed through a scanning electron microscope. Needle crystals formed separate from each other were observed as shown in FIG. 11.

Figure 13:
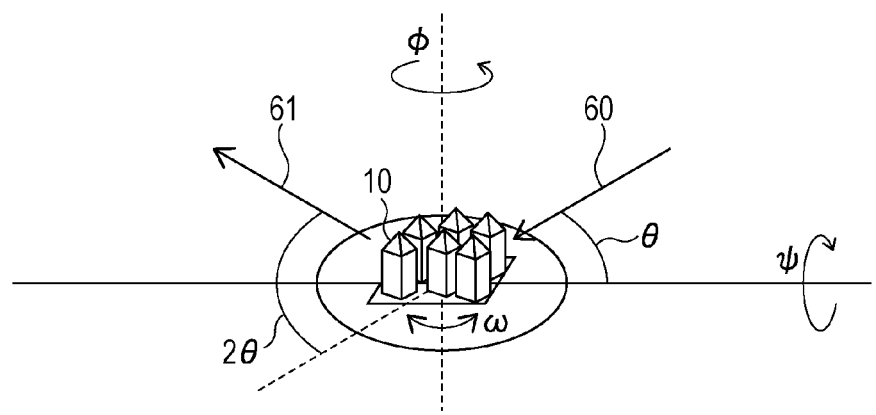
FIG. 13 is an illustrative representation of an evaluation of the orientation in a plane of a deposited film by using an X-ray diffractometer.
Figure 14:
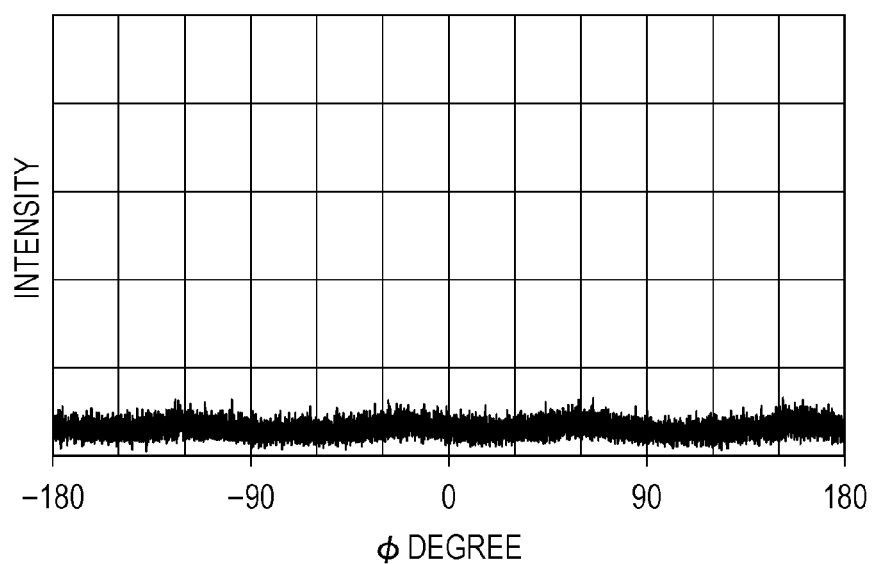
FIG. 14 is a φ scan result of the Comparative Example.

Subsequently, the resulting scintillator layer was subjected to measurements for orientation in a plane at the deposition surface, packing density, and MTF. The orientation in a plane at the deposition surface was measured by ϕ scanning. For scintillator layers containing a plurality of cesium iodide crystals, <110> crystal orientations 31 around [001] crystal orientation 30 of cesium iodide crystals were measured by ϕ scanning. If there appear four peaks at regular intervals (1/2π), the scintillator layer has 4-fold rotational symmetry, that is, the orientations of the crystals in the scintillator layer are aligned. The procedure will be described in detail below. First, θ(=ω)–2θ scan was performed using Cu-Kα rays from an X-ray diffractometer, as shown in FIG. 13, and thus the measurement angle was fixed so that the diffraction peak of the (100) plane could appear. Then, a rocking curve was obtained by ω scan, and the half-width was 3°. This suggests that the tilt of the needle crystals with respect to the deposition surface of the substrate were small. Then, the scintillator layer was rotated 45° in the ψ direction, and the angle for θ–2θ was adjusted so that the diffraction peak of the (110) plane could appear. The sample was thus measured throughout 360° while being rotated in the ϕ direction. As a result, as shown in FIG. 14, rotational symmetry, except for waves resulting from the shape of the square substrate, was hardly shown and diffractions from <110> occurred in any directions uniformly. It was thus found that peaks did not appear. In FIG. 13, reference numeral 60 designates incident X rays and reference numeral 61 designates reflected X rays.

The packing density was measured in the following procedure. The surface of the scintillator layer defined by needle crystals deposited in the final stage of the vapor deposition were soaked with a light absorptive black ink from the tips of the crystals, and the tips were ground and bonded to a transparent substrate with a low-melting point wax. Then, the scintillator layer in this state was removed from the substrate. Then, the crystals were further ground to such a thickness as the tips of the needle crystals were left. Thus a test sample was prepared. The test sample was observed through an optical microscope, and a plane observation picture was taken for measurement of the areas of the needle crystals and spaces therebetween. The packing density calculated was 67%.

Subsequently, the modulation transfer function or MTF, which is an index of resolution, was measured. For obtaining the MTF, a value corresponding to a spatial frequency of 2 Lp/mm (line pairs per millimeter) was measured using an X-ray beam satisfying the international standard IEC-RQA5 radiation beam quality. The surface of the scintillator layer formed in the Comparative Example was pressed on a photodetector (1500×1000 pixels) with a FOP (fiber optic plate) therebetween. The scintillator layer was vertically irradiated with X-ray beam through the substrate, and the MTF was obtained by an edge method using a tungsten knife edge. The thus obtained MTF of the Comparative Example was defined as 100.

Example 1

Example 1 incorporated the first embodiment. In the present Example, a scintillator panel including a scintillator layer containing a plurality of needle crystals 10 of mainly cesium iodide was produced by oblique vapor deposition using an intermittent deposition shutter 9 having openings 14 as shown in FIG. 5A in a manner as shown in FIG. 5B. The deposition was performed in the same manner as in the Comparative Example except that the intermittent deposition shutter 9 was disposed between the substrate and the deposition source, and thus description thereof was omitted.

The intermittent deposition shutter 9 (having 4 openings of 10 mm in width and 30 mm in length) was disposed between the deposition surface 6 of the substrate and the deposition source 1. The intermittent deposition shutter 9 was rotated in synchronization with the in-plane rotation of the substrate in such a manner that the intermittent deposition shutter 9 was rotated once in a plane while the substrate was rotated once in a plane (hence, the angular velocities were the same). The ratio of the opening width 19 to the shield portion width 20 was 22:78, and the contrast of the amount of deposit in practice was 120.

After the deposition apparatus was evacuated to 0.01 Pa or less, deposition was started by gradually applying a current to each of a deposition boat containing cesium iodide and a deposition boat containing thallium iodide and opening a shutter (not shown) disposed between the substrate and the deposition source in the same manner as in the Comparative Example. The rotation speeds of the substrate and the intermittent deposition shutter 9 were each 30 rpm. Under the observation of the deposition state, the shutter was closed before the materials 2 ran out. Thus the deposition was completed. The substrate 16 and the deposition source 1 were cooled to room temperature, and the scintillator layer was observed from the side opposing the substrate 16. There were observed a plurality of needle crystals 10 formed separate from each other on the substrate 16.

Figure 15:
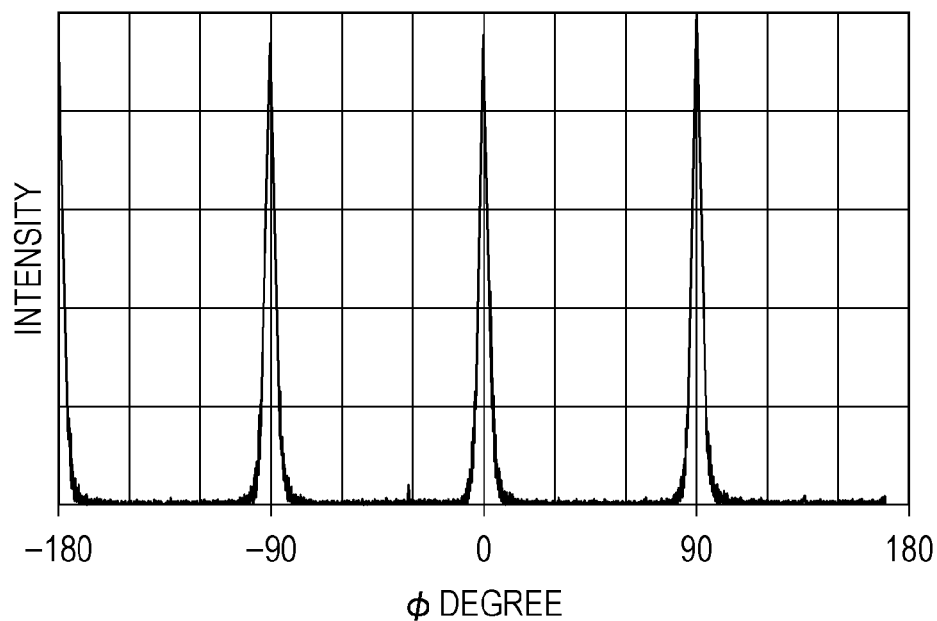
FIG. 15 is a φ scan result of Example 2.

Subsequently, the orientation of the crystals in the scintillator layer in a plane at the deposition surface was evaluated. The half-width of a rocking curve obtained by ω scan was as good as 4°. Furthermore, a φ scan result exhibited four diffraction peaks as shown in FIG. 15. This suggests that the scintillator layer formed in the present Example had 4-fold rotational symmetry, that is, the orientations of the needle crystals 10 in the scintillator layer were aligned. FIG. 15 is shown in a different scale, in terms of vertical axis, from FIG. 14 for the sake of showing the entireties of the peaks. The intensity in FIG. 14 is comparable to the background (very low, substantially flat regions between the peaks) in FIG. 15.

Thus, it was confirmed that the scintillator layer formed in the present Example contained a plurality of needle crystals having the same in-plane orientation according to the direction in which the material was fed.

Example 2

Example 2 is different from Example 1 in the width of the penetrable portions of the intermittent deposition shutter. Other portions are the same as in Example 1 and thus description thereof is omitted.

In the present Example, the intermittent deposition shutter 9 having larger openings in width (4 openings of 24 mm in width and 30 mm in length) than those of Example 1 was disposed between the deposition surface 6 of the substrate 16 and the deposition source 1. The ratio of the opening width 19 to the shield portion width 20 was 48:52, and the contrast of the amount of deposit in practice was 30.

Figure 12:
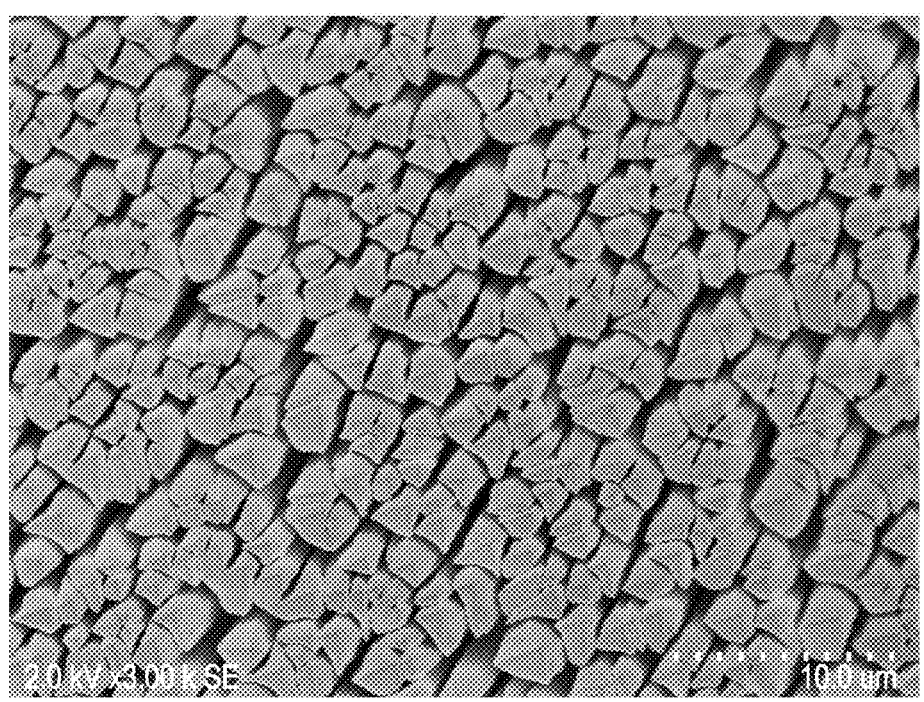
FIG. 12 is a scanning electron micrograph of the surface of a scintillator layer of Example 2.

Vapor deposition was performed in the same manner as in Example 1. After the substrate and the deposition boats were cooled to room temperature, the substrate taken out of the apparatus was observed through a scanning electron microscope. There were observed needle crystals formed separate from each other with a high packing density, as shown in FIG. 12.

Subsequently, the orientation of the crystals in the scintillator layer in a plane at the deposition surface was evaluated. A rocking curve was obtained by ω scan, and the half-width was as good as 3°. The sample was measured throughout 360° while being rotated in the φ direction. The result exhibited four diffraction peaks. This result suggests that the scintillator layer had 4-fold rotational symmetry.

Furthermore, the packing density was measured in the same manner as in the Comparative Example. The packing density of the scintillator layer of the present Example was 71%.

Also, the evaluation result of in-plane orientation of a sample ground to a thickness of several micrometers exhibited 4-fold rotational symmetry. This result suggests that the scintillator layer had satisfactory in-plane orientation with a thickness from at least 50 μm to 100 μm or more. This means that if a scintillator layer has in-plane orientation even though the thickness thereof is 100 μm or less and even though the layer was not epitaxially grown on the deposition surface of the substrate, it can be though that the method of any of the embodiments of the present discloser has been applied.

Subsequently, the MTF was measured in the same manner as in the Comparative Example. The MTF was 103, 3% higher than that of the Comparative Example. Although the MTF was increased, the emission intensity of the scintillator was not reduced.

Thus it was confirmed that the scintillator layer formed in the present Example contained a plurality of needle crystals separate from each other when viewed from the surface thereof and that the packing density was increased though the MTF was increased. The reason why the packing density was increased in spite of the same incident angle as in the Comparative Example is probably that the area of the shadows of the needle crystals producing shadowing effect (voids between needle crystals) was reduced.

Example 3

Example 3 incorporated a modification of the first embodiment. The present Example is different from Example 1 in that screens disposed on the deposition surface 6 of the substrate 16 were used instead of the intermittent deposition shutter for changing the amount of the scintillator material deposited on the deposition surface 6 according to the angle between the projected incident direction and the reference direction.

In the present Example, a scintillator layer containing needle crystals of mainly cesium iodide was formed by oblique vapor deposition using four screens 15 disposed on the deposition surface 6 of a substrate 16, as shown in FIGS. 6A and 6B.

More specifically, first, a deposition boat (made of boron nitride, 30 mm in diameter by 150 mm in length) shown in FIG. 6B, containing 90 g of cesium iodide as the deposition material 2 was prepared as the deposition source 1. Then, the deposition source 1 and a substrate 16 (made of silicon, square of 20 mm on a side, 525 μm in thickness) were disposed in a deposition apparatus so that the deposition material could be emitted at an incident angle 5 of 60° from an emission opening 3 (of 5 mm in diameter) with a distance of 120 mm from the emission opening to the center of the deposition surface 6. In addition, another deposition boat (not shown) containing thallium iodide was disposed so that the material could be deposited on the deposition surface 6. Furthermore, four screens 15 (20 mm in width by 30 mm in height) were arranged on the deposition surface 6. The ratio of the opening width 19 to the shield portion width 20 was 50:50, and the contrast of the amount of deposit in practice was 137.

After the deposition apparatus was evacuated to 0.01 Pa or less, deposition was started by gradually applying a current to each of the deposition boat containing cesium iodide and the deposition boat containing thallium iodide and opening a shutter (not shown) disposed between the substrate and the deposition boat. The rotation speed of the substrate 16 was 30 rpm. Under the observation of the deposition state, the shutter was closed before the materials 2 ran out. Thus the deposition was completed. After the substrate 16 and the deposition boats were cooled to room temperature, the crystallinity and in-plane orientation of the resulting scintillator layer were evaluated in the same manner as in the Comparative Example. The scintillator layer was observed from the side opposing the substrate 16. There were observed a plurality of needle crystals 10 formed separate from each other on the substrate 16. A rocking curve was obtained by ω scan, and the half-width was as good as 1.1°. Furthermore, a φ scan result exhibited four diffraction peaks. This suggests that the scintillator layer formed in the present Example had 4-fold rotational symmetry, that is, the orientations of the needle crystals 10 in the scintillator layer were aligned.

Thus, it was confirmed that the scintillator layer formed in the present Example contained a plurality of needle crystals having the same in-plane orientation according to the direction in which the material was fed.

Example 4

Example 4 is different from Example 3 in the width of the screens 15. Other portions are the same as in Example 3 and thus description thereof is omitted.

In the present Example, four screens 15 (10 mm in width by 30 mm in height) were arranged on the deposition surface 6. The ratio of the opening width 19 to the shield portion width 20 was 73:27, and the contrast of the amount of deposit in practice was 9.8:1.

Vapor deposition was performed in the same manner as in Example 3. After the substrate and the deposition boats were cooled to room temperature, the crystallinity and orientation in a plane of the resulting scintillator layer were evaluated in the same manner as in Example 3. The scintillator layer was observed from the side opposing the substrate 16. There were observed a plurality of needle crystals 10 formed separate from each other on the substrate 16. Furthermore, a φ scan result exhibited four diffraction peaks at regular intervals. This suggests that the scintillator layer formed in the present Example had 4-fold rotational symmetry, that is, the orientations of the needle crystals 10 in the scintillator layer were aligned.

Thus, it was confirmed that the scintillator layer formed in the present Example contained a plurality of needle crystals having the same in-plane orientation according to the direction in which the material was fed.

Subsequently, the MTF was measured in the same manner as in the Comparative Example. The MTF was 102, higher than that of the Comparative Example. Also, the emission intensity of the scintillator layer was not reduced.

Example 5

Example 5 is different from Example 3 in the width of the screens 15. Other portions are the same as in Example 3 and thus description thereof is omitted.

In the present Example, four screens 15 (4 mm in width by 30 mm in height) were arranged on the deposition surface 6. The ratio of the opening width 19 to the shield portion width 20 was 89:11, and the contrast of the amount of deposit in practice was 2.6:1.

Vapor deposition was performed in the same manner as in Example 3. After the substrate and the deposition boats were cooled to room temperature, the crystallinity and in-plane orientation in the surface of the resulting scintillator layer were evaluated in the same manner as in Example 3. The scintillator layer was observed from the side opposing the substrate 16. There were observed a plurality of needle crystals 10 formed separate from each other on the substrate 16. A rocking curve was obtained by ω scan, and the half-width was as good as 1.7°. Furthermore, a φ scan result exhibited four diffraction peaks at regular intervals. The peak intensity was about 20000 counts, and the background intensity was about 500 counts; hence, the contrast thereof was about 40 times.

Thus, it was confirmed that the scintillator layer formed in the present Example contained a plurality of needle crystals having the same in-plane orientation according to the direction in which the material was fed.

Example 6

Example 6 incorporated the second embodiment. The present Example was the same as Example 1 in that a deposition apparatus as shown in FIG. 5B was used, but was different in that the substrate was rotated with varying rotation speed instead of using the intermittent deposition shutter 9.

Vapor deposition was performed in the same manner as in Example 1, except that the substrate was rotated at a speed of 300 rpm with suspension for 0.5 s every one-fourth rotation, instead of disposing the intermittent deposition shutter 9 between the substrate and the deposition source, as mentioned above. The actual contrast of the amount of deposit was not measured. The time for which the projected incident direction and the reference direction formed an angle x (unit was defined as 1 degree) every one rotation was 60 s÷300 rotations÷360 degrees=1/1800 s and the suspension time was ½ s. The deposition time at the angle of suspending rotation was 900 times that at the angle of rotating. Accordingly, the contrast of the amount of deposit was estimated to be 2.6 or more. The substrate and the deposition boats were cooled to room temperature, and then the substrate taken out of the apparatus was observed through a scanning electron microscope. It was confirmed that separate needle crystals with a high packing density were formed by oblique vapor deposition as in Example 2.

The crystallinity and orientation of the resulting scintillator layer were evaluated in the same manner as in Example 1. A rocking curve was obtained by ω scan, and the half-width was as good as 3°. Furthermore, a φ scan result exhibited four diffraction peaks at regular intervals.

Thus, it was confirmed that the scintillator layer formed in the present Example contained a plurality of needle crystals having the same in-plane orientation according to the direction in which the material was fed.

The following table shows the evaluation results of the scintillator layers formed in the Comparative Example and Examples 1 to 6.

TABLE 1

|  | Opening width: Shield width | Contrast of deposit amount | Method | In-plane orientation |
|---|---|---|---|---|
| Example 3 | 50:50 | 137 | Screens | Good |
| Example 1 | 22:38 | 120 | Shutter | Good |
| Example 2 | 48:52 | 30 | Shutter | Good |
| Example 4 | 73:27 | 9.8 | Screens | Good |

TABLE 1-continued

| | Opening width: Shield width | Contrast of deposit amount | Method | In-plane orientation |
|---|---|---|---|---|
| Example 5 | 89:11 | 2.6 | Screens | Good |
| Example 6 | (1/1800 s: 1/2 s) | — | Varying rotation speed | Good |
| Comparative Example | — | 1 | — | Poor |

The results of Examples 1 to 6 suggest that when the contrast of the amount of deposit is 2.6 or more, the resulting needle crystals have in-plane orientation. The results of Examples 2 and 4 suggest that higher contrasts of the amount of deposit tend to lead to increased MTF.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-010462, filed Jan. 22, 2015, which is hereby incorporated by reference herein in its entirety.

What is claimed is:

1. A method for manufacturing a scintillator panel including a substrate and a scintillator layer containing a plurality of crystals formed by depositing a scintillator material on a deposition surface of the substrate, the method comprising:
   depositing the scintillator material on the deposition surface of the substrate such that the scintillator material incidents on the deposition surface obliquely with respect to the normal to the deposition surface; and
   varying the angle between a reference direction on the deposition surface and a projected incident direction that is obtained by projecting the direction of the scintillator material incident onto the deposition surface,
   wherein the amount of the scintillator material deposited onto the deposition surface changes according to the angle between the projected incident direction and the reference direction.

2. The method according to claim 1, wherein the depositing of the scintillator material and the varying of the angle are performed at one time.

3. The method according to claim 1, wherein the depositing of the scintillator material and the varying of the angle are alternately performed.

4. The method according to claim 1, wherein the contrast of the amount of the deposited scintillator material varied according to the angle between the projected incident direction and the reference direction is 2.6 or more.

5. The method according to claim 1, wherein each of the crystals in the scintillator layer has n-fold rotational symmetry, and the amount of the deposited scintillator material periodically changes in a cycle of $2\pi/n$.

6. The method according to claim 1, wherein the method uses a deposition source that emits the scintillator material onto the deposition surface, and a shutter disposed between the deposition source and the deposition surface and configured to block the scintillator material emitted in a direction forming a specific angle between the reference direction and the projected incident direction.

7. The method according to claim 6, wherein the shutter includes a shield portion that blocks the scintillator material, and a penetrable portion through which the scintillator material passes, and the shutter is operable such that the shielding portion and the penetrable portion are each located between the deposition source and the deposition surface a plurality of times while the angle between the projected incident direction and the reference direction is varied from 0 to $2\pi$.

8. The method according to claim 1, wherein the substrate is provided with a plurality of screens on the deposition surface with spaces therebetween.

9. The method according to claim 1, wherein the varying of the angle is performed by in-plane rotation of the substrate.

10. The method according to claim 1, wherein the method uses a deposition source that emits the scintillator material onto the deposition surface, and the varying of the angle is performed by rotating the deposition source around the substrate with the projected incident direction maintained with respect to the normal to the deposition surface.

11. The method according to claim 1, wherein the method uses a plurality of deposition sources disposed so that the angles between each of the projected incident directions of the deposition sources and the reference direction are different from each other, and the amount of the scintillator material deposited on the deposition surface changes by depositing the deposition material on the deposition surface from the plurality of deposition sources one after another according to the angle between the projected incident direction and the reference direction.

12. The method according to claim 1, wherein the amount of the scintillator material deposited on the deposition surface changes according to the angle between the projected incident angle and the reference angel by in-plane rotation of the substrate at a speed varied during a single rotation.

13. The method according to claim 1, wherein the method used a deposition source that emits the scintillator material to the deposition surface, and the amount of the scintillator material deposited on the deposition surface changes according to the angle between the projected incident angle and the reference angle by revolting the deposition source around the substrate with a speed varied during a single rotation thereof.

14. The method according to claim 1, wherein the depositing of the scintillator material includes:
   a first deposition step of depositing the scintillator material on the deposition surface such that the projected incident direction and the reference direction form a first angle;
   a second deposition step of depositing the scintillator material on the deposition surface such that the projected incident direction and the reference direction form a second angle;
   a third deposition step of depositing the scintillator material on the deposition surface such that the projected incident direction and the reference direction form a third angle; and
   a fourth deposition step of depositing the scintillator material on the deposition surface such that the projected incident direction and the reference direction form a fourth angle,
   wherein the largest amount of the scintillator material deposited on the deposition surface in the first deposition step is 2.6 times or more the smallest amount of the scintillator material deposited on the deposition surface at an angle larger than the first angle and smaller than the second angle, the largest amount of the scintillator material deposited on the deposition surface in the second deposition step is 2.6 times or more the smallest amount of the scintillator material deposited on the deposition surface at an angle larger than the second angle and smaller than the third angle, the largest amount of the scintillator material deposited on the deposition surface in the third deposition step is 2.6 times or more the smallest amount of the scintillator material deposited on the deposition surface at an angle larger than the third angle and smaller than the fourth angle, and the largest amount of the scintillator material deposited on the deposition surface by the fourth deposition step is 2.6 times or more the smallest amount of the scintillator material deposited on the deposition surface at an angle larger than the fourth angle and smaller than the first angle.

15. The method according to claim 1, wherein the scintillator material is cesium iodide.

16. A method for manufacturing a radiation detector, the method comprising:

preparing a scintillator panel including a substrate and a scintillator layer containing a plurality of crystals formed by depositing a scintillator material on a deposition surface of the substrate while varying the angle between a reference direction on the deposition surface and a projected incident direction that is obtained by projecting the direction of the scintillator material incident onto the deposition surface; and fixing the scintillator panel to a photodetector capable of detecting light emitted from the scintillator layer of the scintillator panel by irradiation with a radiation, wherein the amount of the scintillator material deposited on the deposition surface changes according to the angle between the projected incident direction and the reference direction.

17. A scintillator panel comprising:

a substrate;

a scintillator layer disposed on the substrate, the scintillator layer containing a plurality of scintillator needle crystals whose tip-portions orientations are aligned, wherein an crystal orientation of the substrate is different from the orientation of the tip portions of the scintillator needle crystals.

18. The scintillator panel according to claim 17, wherein a surface of the substrate in contact with the scintillator layer is amorphous.

19. The scintillator panel according to claim 17, wherein the scintillator needle crystals are made of cesium iodide, and the surface of the substrate in contact with the scintillator layer is made of a material other than cesium iodide.

20. A radiation detector comprising:

the scintillator panel as set forth in claim 17; and a photo detector including a plurality of light-receiving elements, the photo detector being configured to detect light emitted from the scintillator panel.

* * * * *